(12) United States Patent
Yuda (10) Patent No.: US 8,818,578 B2
(45) Date of Patent: Aug. 26, 2014

(54) CONTROL DEVICE, HYBRID VEHICLE, CONTROL METHOD, AND COMPUTER PROGRAM

(75) Inventor: Naoki Yuda, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/876,197

(22) PCT Filed: Oct. 20, 2011

(86) PCT No.: PCT/JP2011/074142
§ 371 (c)(1),
(2), (4) Date: Apr. 30, 2013

(87) PCT Pub. No.: WO2012/101878
PCT Pub. Date: Aug. 2, 2012

(65) Prior Publication Data
US 2013/0304288 A1 Nov. 14, 2013

(30) Foreign Application Priority Data
Jan. 25, 2011 (JP) ................................ 2011-012769

(51) Int. Cl.
*G06F 7/00* (2006.01)
*B60W 10/08* (2006.01)
*B60W 20/00* (2006.01)
*B60W 10/06* (2006.01)
*B60L 11/18* (2006.01)

(52) U.S. Cl.
CPC ............... *B60W 10/08* (2013.01); *B60W 20/00* (2013.01); *B60W 10/06* (2013.01); *B60L 11/1809* (2013.01)
USPC ........... 701/11; 180/65.7; 180/65.8; 439/576; 292/216

(58) Field of Classification Search
CPC ..... B60W 10/08; B60W 20/00; B60W 10/06; B60L 11/1809
USPC ............ 701/22; 318/139, 286, 379, 431, 432, 318/468, 539; 292/199, 201, 216, 144; 310/90, 114, 115; 180/65.7, 65.8; 417/419, 426; 70/264; 439/576; 49/280
See application file for complete search history.

(56) References Cited

U.S. PATENT DOCUMENTS

2005/0256623 A1 11/2005 Hubbard et al.
2007/0162200 A1 7/2007 Zillmer et al.
(Continued)

FOREIGN PATENT DOCUMENTS

DE 102008042544 A1 4/2010
EP 0 919 423 A2 6/1999
(Continued)

OTHER PUBLICATIONS

The above reference was cited in the International Search Report of the corresponding International Application, PCT/ JP2011/074142 dated Nov. 15, 2011.
(Continued)

*Primary Examiner* — McDieunel Marc
(74) *Attorney, Agent, or Firm* — Cowan, Liebowitz & Latman, P.C.; Mark Montague (57) ABSTRACT

An electric motor can assist an engine at high conversion efficiency. A lower limit is set for the torque shared with an engine by the electric motor when the engine and the electric motor are operated together for traveling, and a hybrid ECU has an assistance control unit that implements control to a traveling mode in which the engine and the electric motor operate together, only when it is estimated that the torque shared with the engine by the electric motor is equal to or greater than the torque lower limit when the electric motor and the engine are operated together for traveling.

8 Claims, 7 Drawing Sheets

(56) References Cited

U.S. PATENT DOCUMENTS

| | | | |
|---|---|---|---|
| 2013/0131901 A1* | 5/2013 | Yamagata et al. | 701/22 |
| 2013/0131902 A1* | 5/2013 | Yamagata | 701/22 |
| 2013/0131903 A1* | 5/2013 | Araki | 701/22 |
| 2013/0138286 A1* | 5/2013 | Sawayama | 701/22 |
| 2013/0158767 A1* | 6/2013 | Araki | 701/22 |
| 2013/0158768 A1* | 6/2013 | Sawayama | 701/22 |
| 2013/0158769 A1* | 6/2013 | Sawayama | 701/22 |
| 2013/0158770 A1* | 6/2013 | Araki | 701/22 |
| 2013/0166130 A1* | 6/2013 | Suzuki | 701/22 |
| 2013/0173107 A1* | 7/2013 | Kokon | 701/22 |
| 2013/0179022 A1* | 7/2013 | Ueno | 701/22 |
| 2013/0184919 A1* | 7/2013 | Kabe | 701/22 |
| 2013/0184922 A1* | 7/2013 | Kabe | 701/22 |
| 2013/0184923 A1* | 7/2013 | Sawayama | 701/22 |
| 2013/0190958 A1* | 7/2013 | Izumi | 701/22 |
| 2013/0197735 A1* | 8/2013 | Ueno | 701/22 |
| 2013/0274976 A1* | 10/2013 | Suzuki | 701/22 |
| 2013/0297136 A1* | 11/2013 | Yamanaka et al. | 701/22 |
| 2013/0332015 A1* | 12/2013 | Dextreit | 701/22 |

FOREIGN PATENT DOCUMENTS

| | | |
|---|---|---|
| EP | 1 302 353 A2 | 4/2003 |
| FR | 2777231 A | 10/1999 |
| JP | 2004-282886 A | 10/2004 |

OTHER PUBLICATIONS

European Search Report issued on May 21, 2014, that issued in the corresponding European Patent Application EP 11 85 6919.

* cited by examiner

CONTROL DEVICE, HYBRID VEHICLE, CONTROL METHOD, AND COMPUTER PROGRAM

CROSS REFERENCE TO RELATED APPLICATIONS

This is a U.S. national stage of application No. PCT/JP2011/074142, filed on Oct. 20, 2011. Priority under 35 U.S.C.§119(a) and 35 U.S.C.§365(b) is claimed from Japanese Patent Application No. 2011-012769, filed on Jan. 25, 2011, the disclosure of which are also incorporated herein by reference.

TECHNICAL FIELD

The present invention relates to a control device, a hybrid vehicle, a regeneration control method, and a computer program.

BACKGROUND ART

A hybrid vehicle includes an engine and an electric motor, and is capable of running with the engine or the electric motor or capable of running by the cooperation between the engine and the electric motor. For example, Patent Literature 1 proposes a hybrid vehicle configured to optimize the fuel consumption of the engine and the state of charge (hereinafter, referred to as SOC) of the battery when the vehicle runs by the cooperation between the engine and the electric motor. Note that, in the below description, the state in which the vehicle runs by the cooperation between the engine and the electric motor will be referred to as "the electric motor assists the engine."

CITATION LIST

Patent Literature

PTL1: JP 2009-107384 A

SUMMARY OF INVENTION

Technical Problem

In a hybrid vehicle, the role of the electric motor is to input electric energy from the battery and convert the energy into energy for the rotary motion to rotate a shaft of the electric motor. Generally, when use of the electric motor at relatively low torque is compared to use of the electric motor at relatively high torque, the use at relatively high torque has better conversion efficiency for converting the electric energy into the energy for the rotary motion. Note that, in the below description, the "conversion efficiency" mainly means the conversion efficiency when the electric motor inputs electric energy from the battery and converts the energy into energy for the rotary motion to rotate a shaft of the electric motor.

By the way, as for a conventional hybrid vehicle, for example, the optimization of the fuel consumption of the engine and the State of Charge of the battery when the vehicle runs by the cooperation between the engine and the electric motor is taken into consideration. However, the conversion efficiency of the electric motor is not taken into consideration. Thus, the electric motor is likely to be used over a long time while the conversion efficiency of the electric motor is low. It is undesirable because such a state easily causes the decrease in the SOC of the battery.

In light of the foregoing, an objective of the present invention is to provide a control device, a hybrid vehicle, a control method, and a computer program where the electric motor can assist the engine with good conversion efficiency.

Solution to Problem

An aspect of the present invention relates to a control device. The control device of a hybrid vehicle that includes an engine and an electric motor and that is capable of running by the engine or the electric motor or capable of running by cooperation between the engine and the electric motor, includes: besides a lower limit set on torque shared by the electric motor and the engine when the vehicle runs by the cooperation between the engine and the electric motor, control means for performing a control to set a running mode in which the engine cooperates with the electric motor only when it is estimated that the torque shared by the electric motor and the engine is equal to or more than the lower limit or exceeds the lower limit while the vehicle runs by the cooperation between the engine and the electric motor.

Alternatively, a control device of a hybrid vehicle that includes an engine and an electric motor and that is capable of running by the engine or the electric motor or capable of running by cooperation between the engine and the electric motor, includes: besides a lower limit set on torque shared by the electric motor and the engine when the vehicle runs by the cooperation between the engine and the electric motor, control means for performing a control to set a running mode in which the engine cooperates with the electric motor only when it is estimated that the time in which the torque shared by the electric motor and the engine is equal to or more than the lower limit or exceeds the lower limit continues for a given length of time while the vehicle runs by the cooperation between the engine and the electric motor.

Another aspect of the present invention relates to a hybrid vehicle. The hybrid vehicle of the present invention includes the control device of the present invention.

Another aspect of the present invention relates to a control method. The control method of a hybrid vehicle that includes an engine and an electric motor and that is capable of running by the engine or the electric motor or capable of running by cooperation between the engine and the electric motor, includes: besides a lower limit set on torque shared by the electric motor and the engine when the vehicle runs by the cooperation between the engine and the electric motor, a control step for performing a control to set a running mode in which the engine cooperates with the electric motor only when it is estimated that the torque shared by the electric motor and the engine is equal to or more than the lower limit or exceeds the lower limit while the vehicle runs by the cooperation between the engine and the electric motor.

Alternatively, a control method of a hybrid vehicle that includes an engine and an electric motor and that is capable of running by the engine or the electric motor or capable of running by cooperation between the engine and the electric motor, includes: besides a lower limit set on torque shared by the electric motor and the engine when the vehicle runs by the cooperation between the engine and the electric motor, a control step for performing a control to set a running mode in which the engine cooperates with the electric motor only when it is estimated that the time in which the torque shared by the electric motor and the engine is equal to or more than the lower limit or exceeds the lower limit continues for a given length of time while the vehicle runs by the cooperation between the engine and the electric motor.

Still another aspect of the present invention relates to a computer program. The computer program causes an information processing apparatus to implement a function of the control device.

Advantageous Effects of Invention

According to the present invention, the electric motor can assist the engine with good conversion efficiency.

DESCRIPTION OF EMBODIMENTS

Hereinafter, the hybrid vehicle according to an embodiment of the present invention will be described with reference to FIGS. 1 to 7.

Figure 1:
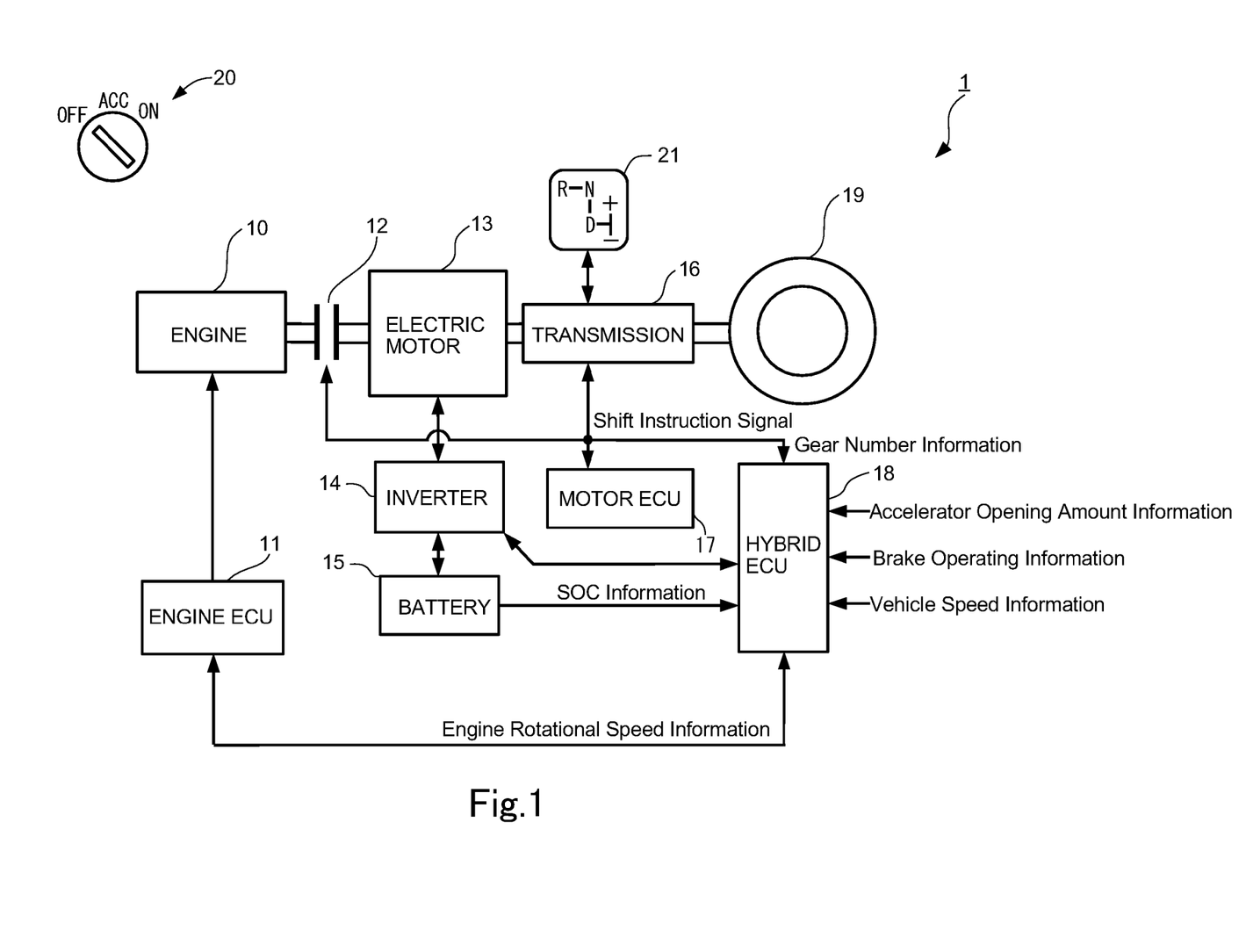
FIG. 1 is a block diagram for illustrating an exemplary structure of a hybrid vehicle according to an embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13. A gearbox including an automated mechanical/manual transmission is placed between the engine 10 and the electric motor 13. Note that the automated mechanical/manual transmission is a transmission that can automatically perform a gear shifting operation while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, an transmission ECU 17, a hybrid ECU 18 (referred to as a control device in claims), a wheel 19, a key switch 20, and a shift unit 21. Note that the transmission 16 includes the above-mentioned automated mechanical/manual transmission, and is operated by the shift unit 21 including a drive range (hereinafter, referred to as a D (Drive) range). When the shift unit 21 is at the D range, the gear shifting operation of the automated mechanical/manual transmission is automated.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 controls the engine 10, for example, the amount of fuel injection and the valve timing, according to the instructions from the hybrid ECU 18. For example, the engine ECU 11 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

The clutch 12 is controlled by the transmission ECU 17, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the transmission ECU 17 in order to transmit the shaft output of the engine 10 to the electric motor 13. On the other hand, the clutch 12 cuts the mechanical connection between the rotating shaft of the engine 10 and the rotating shaft of the electric motor 13 so that the rotating shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 is stopped or is in an idling state and the hybrid vehicle 1 runs by the driving force of the electric motor 13, and when the hybrid vehicle 1 reduces the speed or runs on the downgrade and the electric motor 13 generates (regenerates) electric power while the engine 10 is stopped or is in an idling state.

Note that the clutch 12 differs from a clutch operated by the driver's operation of a clutch pedal, and is operated by the control of the transmission ECU 17.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 reduces the speed or runs on the downgrade. In that case, electric power is generated by the power for rotating the shaft supplied from the transmission 16 and is supplied to the inverter 14 in order to charge the battery 15. At that time, the electric motor 13 generates regeneration torque corresponding to the regenerated electric power.

The inverter 14 is controlled by the hybrid ECU 18, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power. A proper range of the SOC is determined for the battery 15 and the battery 15 is controlled to maintain the SOC within the range.

The transmission 16 includes an automated mechanical/manual transmission (not shown in the drawings) that selects one of a plurality of gear ratios (change gear ratios) according to the shift instruction signal from the transmission ECU 17 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the downgrade. Note that the automated mechanical/manual transmission can also shift the gear position to a given gear number by the driver's hand operation of the shift unit 21.

The transmission ECU 17 is a computer for controlling the clutch 12 and the transmission 16. In other words, the transmission ECU 17 controls the clutch 12 and obtains gear number information from the transmission 16 to supply, to the transmission 16, the shift instruction signal based on the obtained gear number information in order to control the transmission 16. For example, the transmission ECU 17 includes a CPU, an ASIC, a microprocessor (micro-computer), a DSP, and the like, and internally has an operation unit, a memory, an I/O port, and the like.

The hybrid ECU 18 is an example of a computer. For hybrid running, the hybrid ECU 18 obtains accelerator opening amount information, brake operation information, vehicle speed information, engine rotational speed information, and SOC information. Based on the obtained information, the hybrid ECU 18 gives the control instruction to the inverter 14 and gives the control instruction of the engine 10 to the engine ECU 11. The control instructions also include an assistance control instruction described below. For example, the hybrid ECU 18 includes a CPU, an ASIC, a microprocessor (micro-computer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the transmission ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the key switch activates each unit of the hybrid vehicle 1, and turning OFF the key switch 20 stops each unit of the hybrid vehicle 1.

As described above, the shift unit 21 is for giving the instructions from the driver to the automated mechanical/manual transmission in the transmission 16. When the shift unit 21 is at the D range, the gear shifting operation of the automated mechanical/manual transmission is automated.

Figure 2:
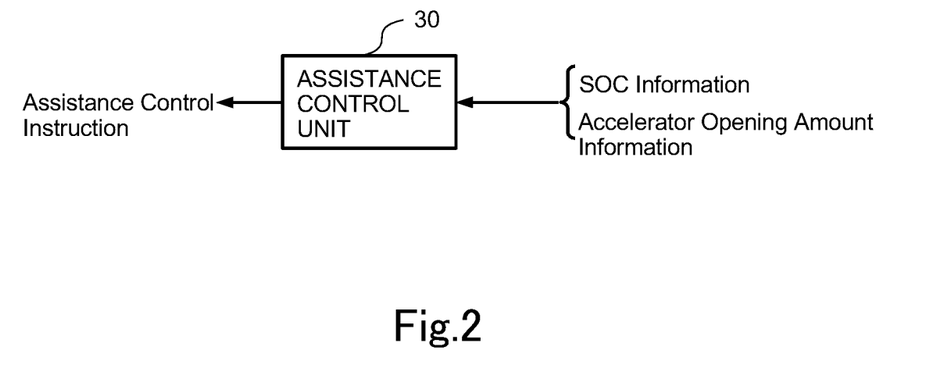
FIG. 2 is a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 executing a computer program. In other words, when the hybrid ECU 18 executes a computer program, the function of an assistance control unit 30 (referred to as control means in claims) is implemented.

The assistance control unit 30 is a function for giving an instruction for an assistance control to the engine ECU 11 based on the SOC information and the accelerator opening amount information. For example, from the SOC information, the assistance control unit 30 determines whether the electric motor 13 can assist the engine 10 in light of the SOC of the battery 15. From the accelerator opening amount information, the assistance control unit 30 determines how much torque the driver requests. The requested torque is namely the required torque. Based on the required torque, the assistance control unit 30 performs a control to determine the share of torque between the engine 10 and the electric motor 13. Note that, when the assistance control unit 30 shares the torque between the engine 10 and the electric motor 13, there is some ways, for example, using the above-mentioned assistance map.

Figure 3:
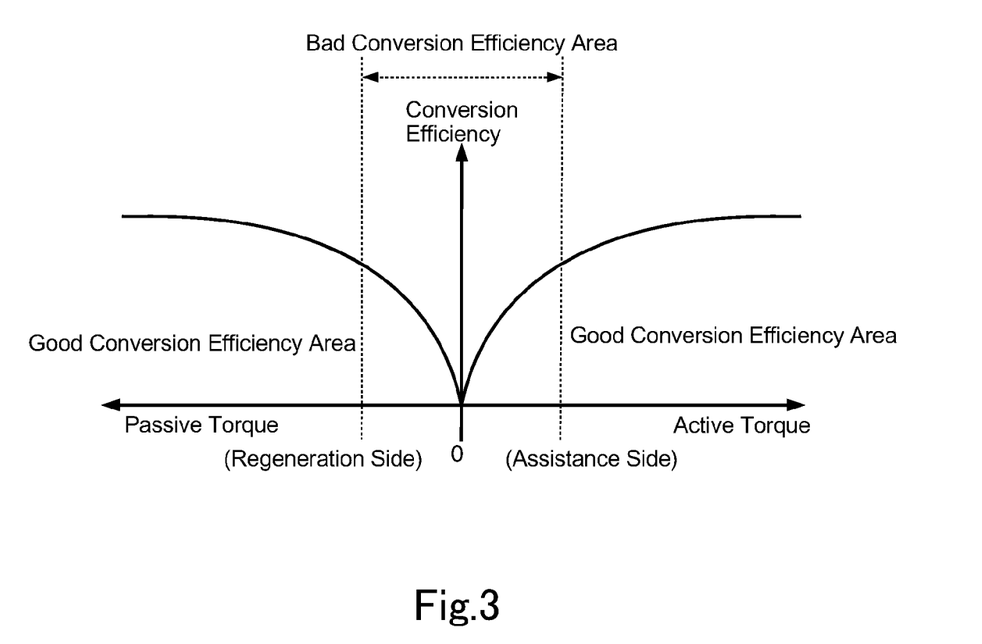
FIG. 3 is a view for illustrating the relationships between the conversion efficiency of the electric motor and torque at both of the assistance side and the regeneration side.

Next, the relationship between the conversion efficiency of the electric motor 13 and torque will be described with reference to FIG. 3. The role of the electric motor 13 is to input electric energy from the battery 15 and convert the energy into energy for the rotary motion to rotate a shaft of the electric motor 13. As illustrated in FIG. 3, generally, when use of the electric motor 13 at relatively low torque is compared to use at relatively high torque, the use at relatively high torque has better conversion efficiency for converting the electric energy into the energy for the rotary motion.

In FIG. 3, an assistance side (right side) and a regeneration side (left side) have almost left-right symmetry. At the assistance side, the electric motor 13 works as the power of the hybrid vehicle 1 to input electric energy from the battery 15 and convert the electric energy into energy for the rotary motion to rotate a shaft of the electric motor 13. On the other hand, at the regeneration side, the electric motor 13 works as an electric generator for charging the battery 15. The turning force of the wheel 19 rotates the shaft of the electric motor 13 and the energy of the rotary motion of the shaft is converted into electric energy and charges the battery 15. In FIG. 3, for distinction, the torque on the assistance side is shown as active torque and the torque on the regeneration side is shown as passive torque. While the "conversion efficiency" herein relates to the assistance side, use of the electric motor at relatively high torque has better conversion efficiency also on the regeneration side.

Next, the process for an assistance control implemented in the hybrid ECU 18 executing a computer program will be described with reference to the flowchart in FIG. 4. Note that the outline of the assistance control process will be described here, and the concrete example will be described below with reference to FIGS. 5 to 7. The procedures from step S1 to step S3 in FIG. 4 is a cycle of the process and the process is repeated as long as the key switch 20 is in the ON state.

Figure 4:
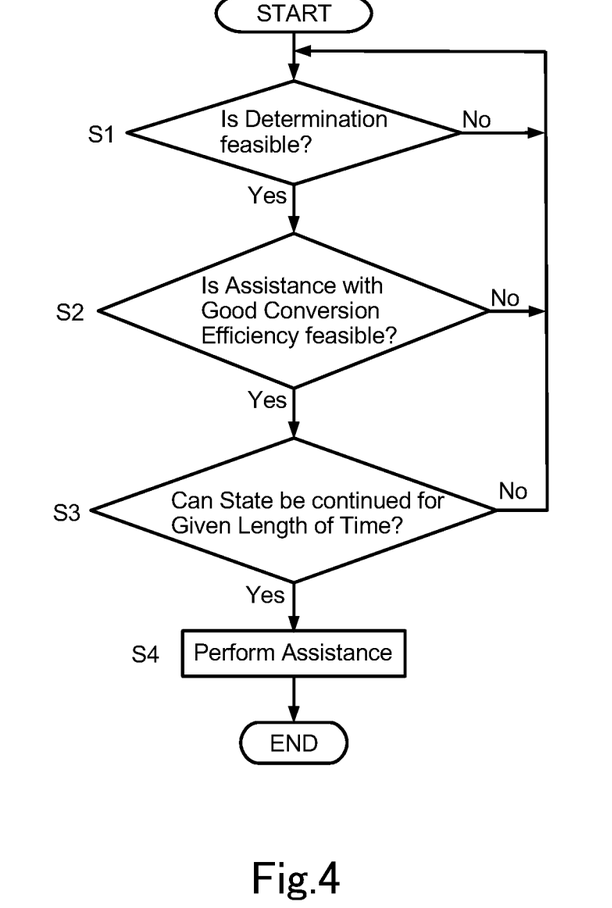
FIG. 4 is a flowchart for illustrating a process in an assistance control unit in FIG. 2.

In the "START" in FIG. 4, the key switch 20 is in the ON state. The hybrid ECU 18 executes a computer program and a function of the assistance control unit 30 is implemented in the hybrid ECU 18. Then, the process goes to step S1.

In step S1, the assistance control unit 30 determines whether the required torque has reached a level where an assistance determination is feasible. For example, an assistance determination is conventionally performed unless the required torque is zero. However, in the present embodiment, the assistance control unit 30 does not start the assistance determination at a level where the electric motor 13 can operate only with low torque and is forced to operate in an area where the conversion efficiency is bad. For example, once the required torque has entered a "good conversion efficiency area" illustrated in FIG. 3, it is determined that the required torque has reached the level where the assistance determination is feasible. When it is determined in step S1 that the required torque exceeds the level where the assistance determination is feasible, or is equal to more than the level, the process goes to step S2. On the other hand, when it is determined in step S1 that the required torque is equal to or less than the level where the assistance determination is feasible, or is less than the level, the process of step S1 is repeated.

In step S2, the assistance control unit 30 determines whether the electric motor 13 can assist the engine 10 with good conversion efficiency in the good conversion efficiency area as illustrated at the assistance side in FIG. 3. When it is determined in step S2 that the assistance with good conversion efficiency is feasible, the process goes to step S3. On the other hand, when it is determined in step S2 that that the assistance with good conversion efficiency is unfeasible, the process goes back to step S1.

In step S3, the assistance control unit 30 determines whether the electric motor 13 can continue assisting the engine 10 for a given length of time with good conversion efficiency in the good conversion efficiency area as illustrated at the assistance side in FIG. 3. When it is determined in step S3 that the assistance continued for a given length of time with good conversion efficiency is feasible, the process goes to step S4. On the other hand, when it is determined in step S3 that the assistance continued for a given length of time with good conversion efficiency is unfeasible, the process goes back to step S1.

In step S4, the assistance control unit 30 causes the electric motor 13 to assist the engine 10 and the process is completed (END).

Figure 5:
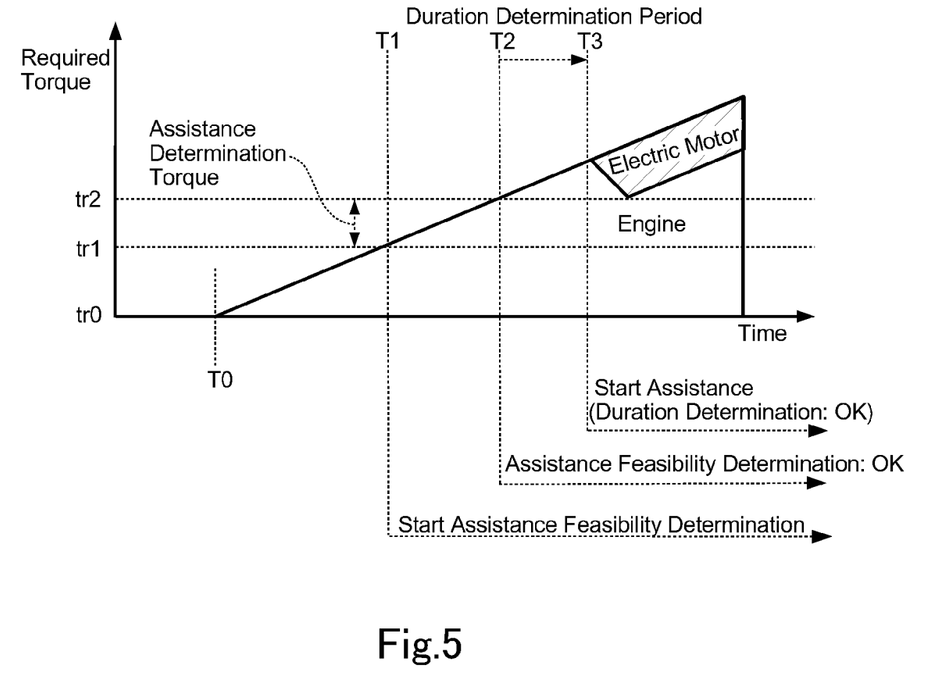
FIG. 5 is a view for illustrating an example in which the torque required for assistance increases as time passes in the process of the assistance control unit in FIG. 2.

Next, an example in which the torque required for the assistance increases as time passes in the process of the assistance control unit 30 will be described with reference to FIG. 5. In FIG. 5, the time passage is shown on the horizontal axis and the torque required for the running of the hybrid vehicle 1 is shown on the vertical axis. In the example in FIG. 5, required torque tr0 for the running of the hybrid vehicle 1 increases from a time T0 as time passes and reaches required torque tr1 at a time T1. In the example in FIG. 5, an assistance feasibility determination is started at the required torque tr1. Conventionally, the assistance feasibility determination is started at the time T0. However, the assistance control unit 30 does not start the assistance feasibility determination as long as the required torque is equal to or less than the required torque tr1, or is less than the required torque tr1 because the electric motor 13 can operate only with low torque and is forced to operate in the bad conversion efficiency area in the range from the time T0 and the time T1.

In the example in FIG. 5, the required torque reaches required torque tr2 at a time T2 and, at that time, the assistance control unit 30 determines that the electric motor 13 can assist the engine 10. In other words, the required torque tr1 to tr2 is the assistance determination torque.

Further, in the example in FIG. 5, the period from the time T2 to a time T3 is shown as a duration determination period. In the example in FIG. 5, the required torque continues being equal to or more than the required torque tr2 or exceeding the required torque tr2 for a given length of time because the required torque continue increasing even in the period from the time T2 to the time T3. From this, the assistance control unit 30 determines that the duration determination in the period from the time T2 to the time T3 is "feasible: OK" and starts the assistance from the time T3. At that case, the shaded area in FIG. 5 shows the area where the electric motor 13 assists the engine 10.

Figure 6:
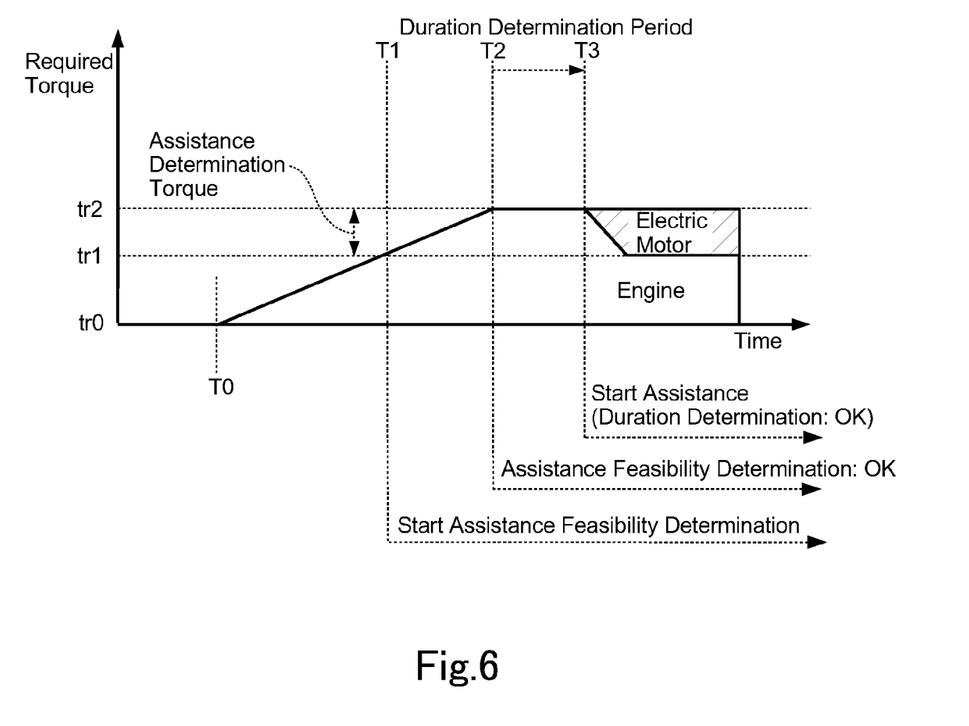
FIG. 6 is a view for illustrating an example in which the torque required for assistance keeps a constant magnitude for a given length of time in the process of the assistance control unit in FIG. 2.

Next, an example in which the torque required for assistance keeps a constant magnitude from the time T2 in the process of the assistance control unit 30 will be described with reference to FIG. 6. In the example in FIG. 6, similarly to the example in FIG. 5, required torque tr0 for the running of the hybrid vehicle 1 increases from a time T0 as time passes and reaches required torque tr1 at a time T1. However, required torque tr2 keeps a constant magnitude after the time T2. Even in such a case, the required torque tr2 at which the assistance is feasible is kept from the time T2 to a time T3. Thus, the assistance control unit 30 determines that the duration determination in the period from the time T2 to the time T3 is "feasible: OK" and starts the assistance from the time T3.

Figure 7:
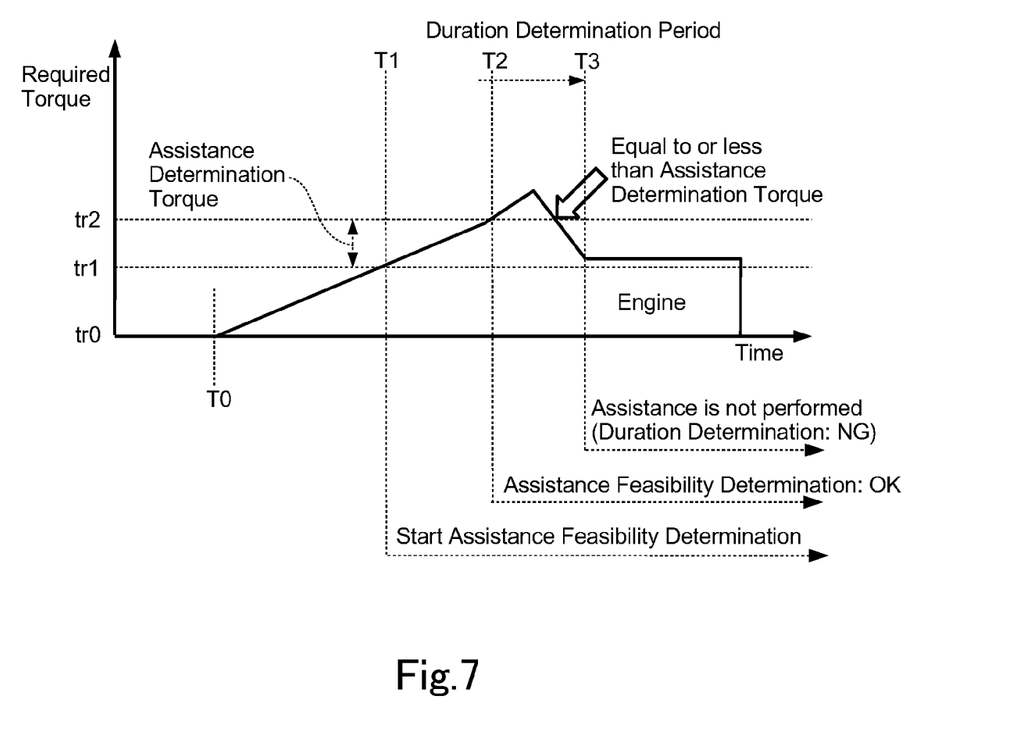
FIG. 7 is a view for illustrating an example in which the assistance feasibility determination torque has not come to be fulfilled in the duration determination in the process of the assistance control unit in FIG. 2.

Next, an example in which the assistance feasibility determination torque has come to be unfulfilled in the duration determination in the process of the assistance control unit 30 will be described with reference to FIG. 7. In the example in FIG. 7, similarly to the example in FIG. 5, required torque tr0 for the running of the hybrid vehicle 1 increases from a time T0 as time passes and reaches required torque tr1 at a time T1. However, the required torque gradually decreases although temporarily exceeding required torque tr2 in the period between a time T2 and a time T3, and then is equal to or less than the required torque tr2 or is less than the required torque tr2. Thus, the assistance control unit 30 determines that the duration determination in the period from the time T2 to the time T3 is "unfeasible: NG" and does not perform the assistance from the time T3 because the required torque tr2 in which the assistance is feasible is not continued in the period between a time T2 and a time T3.

Effects

The electric motor 13 is controlled not to assist the engine 10 at low torque at which the conversion efficiency of the electric motor 13 is bad. Thus, the electric motor 13 can assist the engine 10 with good conversion efficiency. This causes efficient use of the electric power of the battery 15 so that the SOC of the battery 15 can be kept high.

Only when the electric motor 13 can continue assisting the engine 10 with good conversion efficiency for a given length of time, the assistance is actually performed. This can prevent the frequent repetition of the state in which the assistance is performed and the state in which the assistance is not performed. If the repetition occurred, the clutch 12 frequently and repeatedly be engaged and disengaged. At that case, when the clutch 12 is switched from the disengaged state to the engaged state, it is necessary to perform a control to keep the rotational speed of the engine 10 higher than that in the idling state in order to synchronize the rotational speed of the engine 10 with the rotational speed of the electric motor 13. This causes the fuel consumption to be worse. Such worsening of the fuel consumption can be prevented by the assistance that is actually performed only when the electric motor 13 can continue assisting the engine 10 with good conversion efficiency for a given length of time.

Other Embodiments

Although the engine 10 has been described as an internal combustion engine, the engine 10 can also be a heat engine including an external combustion engine.

Further, while the computer program executed by the hybrid ECU 18 is installed on the hybrid ECU 18 in advance in the above-mentioned descriptions, the computer program can be installed on the hybrid ECU 18 as a computer by attaching removable media recording the computer program (storing the program), for example, to a drive (not shown in the drawings) and storing the computer program read from the removable media in a non-volatile memory inside the hybrid ECU 18, or by receiving, with a communication unit (not shown in the drawings), a computer program transmitted through a wired or wireless transmission medium and storing the computer program in a non-volatile memory inside the hybrid ECU 18.

Further, each of the ECUs can be implemented by an ECU combining the ECUs. Alternatively, an ECU can newly be provided by the further subdivision of the function of each ECU.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiment, and can variously be modified without departing from the gist of the invention.

In the above-mentioned description of the embodiment, once the required torque has entered a "good conversion efficiency area (assistance side)" illustrated in FIG. 3, it is determined that the required torque has reached the level where the assistance determination is feasible. This means that the required torque has completely entered the "good conversion efficiency area (assistance side)" illustrated in FIG. 3. On the other hand, when the required torque often comes in and out of the "good conversion efficiency area (assistance side)" illustrated in FIG. 3, it can be determined that the required torque has reached the level where the assistance determination is feasible. To this end, for example, the average value of the required torque in a given length of time is calculated. When the calculated average value of the required torque has entered the "good conversion efficiency area (assistance side)" illustrated in FIG. 3, it is determined that the required torque has reached the level where the assistance determination is feasible.

In the above-mentioned embodiment, it is determined in step S3 whether the state in which "the assistance with good conversion efficiency is feasible" in step S2 "continues for a given length of time". In that case, once the state in step S2 is stopped even only for a short time before the state has continued for the given length of time although "the assistance with good conversion efficiency is feasible" for most of the given length of time, the determination result in step S3 is "No". To avoid the result, the average value of the assistance torque of the electric motor 13 in a given length of time is found and, when the average value is in the area in which "the assistance with good conversion efficiency is feasible", the process can go to step S4 to perform the assistance. For example, in the flowchart of FIG. 4, step S2 is changed into the procedure for determining "Is the average value of the torque of the electric motor 13 in a given length of time in the state in which the assistance with good conversion efficiency is feasible?" and step S3 is deleted. This can perform the assistance when the required torque is kept, for most of the given length of time, at the magnitude at which "the assistance with good conversion efficiency is feasible", so that the number of times to perform the assistance can be increased.

Alternatively, even though the required torque has not entered the "good conversion efficiency area (assistance side)" illustrated in FIG. 3, it can be determined that the required torque has reached the level where the assistance determination is feasible when the rate of increase in the required torque is large and it is estimated that the required torque rapidly enters the "good conversion efficiency area (assistance side)". To this end, a threshold is set for the rate of increase in the required torque and it is determined, when the rate of increase in the required torque exceeds the threshold, that the required torque has reached the level where the assistance determination is feasible.

Further, in the above-mentioned embodiment, it is determined in step S3 whether the state in which "the assistance with good conversion efficiency is feasible" in step S2 "continues for a given length of time". At that case, when the rate of increase in the required torque is large and it is estimated that the required torque rapidly enters the "good conversion efficiency area (assistance side)" or it is estimated that the state in which "the assistance with good conversion efficiency is feasible" "continues for a given length of time", the process can also go to step S4 to perform the assistance. For example, in the flowchart in FIG. 4, step S2 is changed into the procedure for determining "Has the rate of increase in the required torque exceeded the threshold?" and step S3 is deleted. This can perform the assistance when it is estimated that the required torque rapidly enters the "good conversion efficiency area (assistance side)" or it is estimated that the state in which "the assistance with good conversion efficiency is feasible" "continues for a given length of time", so that the timing for starting the assistance can be accelerated and the number of times to perform the assistance can be increased.

Further, a condition of the assistance termination after the vehicle is shifted to an assistance run has not been described in the above-mentioned embodiment. However, for example, the assistance can be terminated when the required torque enters the "bad conversion efficiency area" illustrated in FIG. 3. Further, a threshold is properly set at a value in which the conversion efficiency of the electric motor 13 is low, and the assistance is terminated when the required torque is equal to or less than the threshold. Alternatively, regardless of the conversion efficiency, the assistance can be terminated in order to protect the battery 15 or the inverter 14 when the temperature of the battery 15 or the inverter 14 becomes high.

Further, when the SOC of the battery 15 is high, the assistance can be performed to prevent the increase in the SOC, even though the conversion efficiency becomes worse to some degree, in order to continue the state in which regeneration braking is feasible. To respond to such a case, the threshold for the determination in step 51 in FIG. 4 can be changed according to the SOC of the battery 15. For example, when the SOC is higher than a predetermined value, the boundary point between the "good conversion efficiency area (assistance side)" and the "bad conversion efficiency area" illustrated in FIG. 3 is moved toward the zero point (in a left direction of the drawing) by a predetermined amount. This moves the determination criterion in step 51 in a direction to ease the criterion and the number of times to perform the assistance is increased, so that the SOC of the battery 15 can be prevented from increasing and the state in which the regeneration braking is feasible can be continued.

Further, even at the same required torque, the torque of the electric motor 13 varies between the assistance at a low gear number and the assistance at a high gear number. At that case, a low gear number has a torque in the "bad conversion efficiency area" illustrated in FIG. 3 and a high gear number has a torque in the "good conversion efficiency area (assistance side)" illustrated in FIG. 3. Then, the assistance can be performed at a high gear number.

The invention claimed is:

1. A control device of a hybrid vehicle that includes an engine and an electric motor and that is capable of running by the engine or the electric motor or capable of running by cooperation between the engine and the electric motor, the control device comprising:

besides a lower limit set on torque shared by the electric motor and the engine when the vehicle runs by the cooperation between the engine and the electric motor, a control unit for performing a control to mechanically connect, by a clutch, a rotating shaft of the engine to a rotating shaft of the electric motor such that the vehicle is driven only by the engine and to set a running mode in which the engine cooperates with the electric motor to drive the vehicle only when it is estimated that the time in which the torque shared by the electric motor and the engine is equal to or more than the lower limit or exceeds the lower limit and continues for a given length of time while the vehicle runs by the cooperation between the engine and the electric motor.

2. A hybrid vehicle comprising the control device according to claim 1.

3. A computer program for causing an information processing apparatus to implement a function of the control device according to claim 1.

4. The control device according to claim 1, wherein the estimation is performed when the time is larger than zero and exceeds a predetermined value less than the lower limit.

5. A control method of a hybrid vehicle that includes an engine and an electric motor and that is capable of running by the engine or the electric motor or capable of running by cooperation between the engine and the electric motor, the control method comprising:

besides a lower limit set on torque shared by the electric motor and the engine when the vehicle runs by the cooperation between the engine and the electric motor, a control step for performing a control to mechanically connect, by a clutch, a rotating shaft of the engine to a rotating shaft of the electric motor such that the vehicle is driven only by the engine and to set a running mode in which the engine cooperates with the electric motor to drive the vehicle only when it is estimated that the torque shared by the electric motor and the engine is equal to or more than the lower limit or exceeds the lower limit while the vehicle runs by the cooperation between the engine and the electric motor.

6. The control method according to claim 5, wherein the estimation is performed when the torque is larger than zero and exceeds a predetermined value less than the lower limit.

7. A control method of a hybrid vehicle that includes an engine and an electric motor and that is capable of running by the engine or the electric motor or capable of running by cooperation between the engine and the electric motor, the control method comprising:

besides a lower limit set on torque shared by the electric motor and the engine when the vehicle runs by the cooperation between the engine and the electric motor, a control step for performing a control to mechanically connect, by a clutch, a rotating shaft of the engine to a rotating shaft of the electric motor such that the vehicle is driven only by the engine and to set a running mode in which the engine cooperates with the electric motor to drive the vehicle only when it is estimated that the time in which the torque shared by the electric motor and the engine is equal to or more than the lower limit or exceeds the lower limit continues for a given length of time while the vehicle runs by the cooperation between the engine and the electric motor.

8. The control method according to claim 7, wherein the estimation is performed when the time is larger than zero and exceeds a predetermined value less than the lower limit.

\* \* \* \* \*